Figure 1:
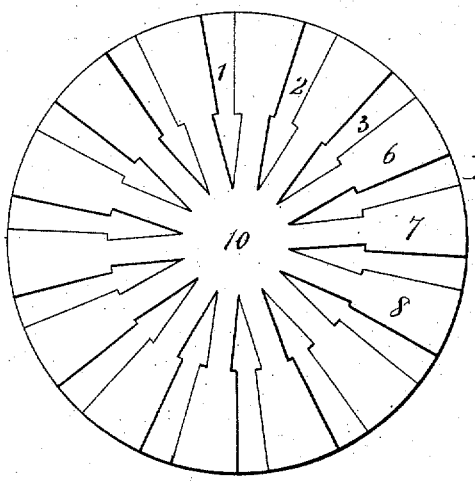
Figure 2:
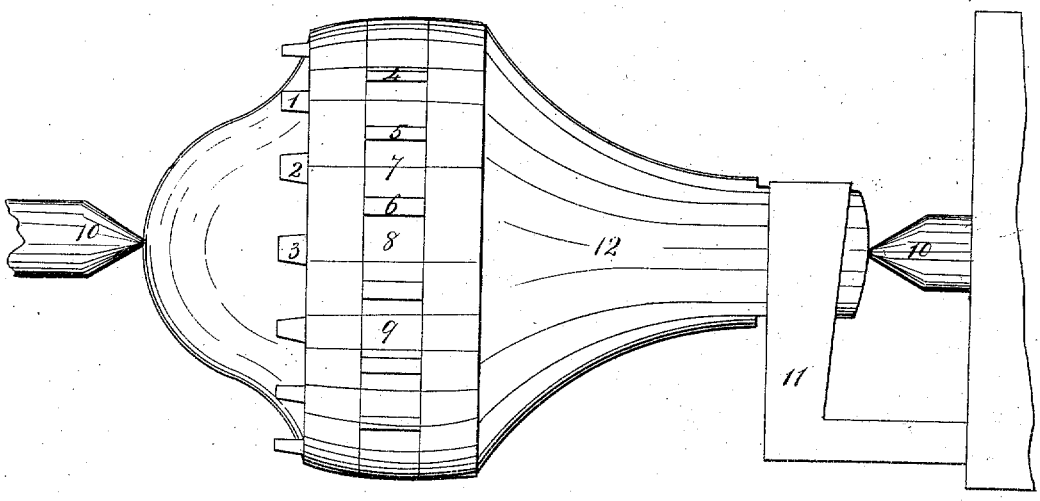

No Printed Specification Available

9637X

J. Hall,

Shoe-Sole Machine.

Patented May 6, 1836.

N. PETERS, PHOTO-LITHOGRAPHER, WASHINGTON, D. C.

May 6. 1836 9637X 26

James Hall of North Bridgewater. Mass:
Letters Patent

The schedule referred to in these Letters Patent, and making part of the same; containing a description in the words of the said James Hall, himself, of his improvement in the machine for cutting and forming keys or presses used ~~and~~ in the manufacture of shoes —

Be it known to all to whom these presents may come that the following is a true and exact specification of a new and useful machine for cutting & forming the instruments or tools called keys or presses used in the manufacture of shoes — invented by James Hall of North Bridgewater, in the County of Plymouth & State of Massachusetts. The said machine consists of a cast-iron or other metallic cylinder or chuck (somewhat resembling the hub of a waggon wheel) with one or more holes (which may be considered as represented by those, for the spokes in a wheel hub) which holes if more than one are so made as all to revolve in the same circle, when the machine is made to revolve in a lathe, & to be of suitable size and dimensions to admit the keys being tapering or contracted towards the axis of motion of the chuck & of a sufficient depth for the insertion of the keys. The keys when inserted into these holes to be cut, stand out, and project above the outside of the machine a distance sufficient for the height of the guard; & they are fixed in the holes by screws, which may be an inch or more in length which are inserted in a direction parallel to the axis of motion of the machine. The machine may terminate at that end at the place of inserting these screws, by a section perpendicular to the axis of motion, or the circumference being ~~being~~ reduced at that place sufficiently to give space for the insertion of the screws the machine may be then extended in a cylindrical form of reduced diameter, or in a tapering, conical, hemispherical, convex, or other form not inconvenient for a chuck — — The other end of the machine admits of an equal variety of form; it is not necessary that the form of the two ends should correspond to each other. The machine in the form above described should be hollow at the centre under the holes, & may be concave from thence towards one or both ends to give room for the starts or shanks of the keys. Such hollow at the centre gives the opportunity of cutting the keys in a smaller circle than they could be cut in, if the machine were solid at the axis of motion through its whole length. The circumference of the machine may be still more reduced, & the faces & guards cut still more curved if the starts or shanks of the keys are bent so as to stand in a circle of of smaller circumference when put into the machine —.
The diameter of the machine heretofore used by the inventor is about five inches, & cuts fourteen keys at once. The face & guard as cut in the machine are not sufficiently curved for ordinary use, & require to be made slightly more curved by filing. The inventor thinks the diameter of this machine may be lessened by so constructing the machine that the starts of the keys may be more bent. The machine may be cast in one or two pieces — the two pieces when it is cast in two, to be soldered, screwed, or otherwise fastened together. The machine may be made in a different form by fixing a washer or circular plate firmly upon a shaft with its face at right angles to the axis of motion of the shaft & having a moveable washer on the shaft that may be made to approach towards & recede from the fixed washer such moveable washer to be kept in place by a nut. The keys are placed between these two plates or washers and confined there by screwing up the nuts & also by inserting a screw against each key through one of the washers to press the key against the other washer. The inventor thinks the first described form of the machine to be preferable. When the machine is used it is put into a lathe and fastened on one side by means of a dog, like any other chuck, & the keys being fastened into the holes, are cut by a chisel or knife by turning the machine in the lathe. The keys may be polished in the chuck by its revolution in the lathe by the application of a file, or of emery or other polishing tools or substances. The accompanying drawings are referred to in explanation, & illustration of this specification. In witness whereof the said Hall hereto sets his hand this thirteenth day of January in the year of our Lord eighteen hundred & thirty-six.

James Hall

Witnesses — J. H. Rainsford — Joseph Sylvester

[882 words

Drawings